United States Patent
Okabe et al.

(10) Patent No.: US 11,021,999 B2
(45) Date of Patent: Jun. 1, 2021

(54) GAS TURBINE COMBUSTOR CASING HAVING A PROJECTION PART

(71) Applicant: MITSUBISHI HEAVY INDUSTRIES AERO ENGINES, LTD., Aichi (JP)

(72) Inventors: Yoshiyuki Okabe, Tokyo (JP); Shigenari Horie, Tokyo (JP); Tadayuki Hanada, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 309 days.

(21) Appl. No.: 16/063,729

(22) PCT Filed: Apr. 1, 2016

(86) PCT No.: PCT/JP2016/060920
§ 371 (c)(1),
(2) Date: Jun. 19, 2018

(87) PCT Pub. No.: WO2017/110104
PCT Pub. Date: Jun. 29, 2017

(65) Prior Publication Data
US 2020/0271017 A1 Aug. 27, 2020

(30) Foreign Application Priority Data
Dec. 24, 2015 (JP) .............................. JP2015-252492

(51) Int. Cl.
*F23R 3/00* (2006.01)
*F01D 25/24* (2006.01)
(Continued)

(52) U.S. Cl.
CPC .............. *F01D 25/243* (2013.01); *F02C 7/20* (2013.01); *F23R 3/002* (2013.01); *F23R 3/42* (2013.01); *F23R 2900/00005* (2013.01)

(58) Field of Classification Search
CPC .. F23R 3/002; F23R 3/50; F23R 2900/00005; F23R 3/60; F01D 25/24; F01D 25/243; F02C 7/20
See application file for complete search history.

(56) References Cited

U.S. PATENT DOCUMENTS 4,525,996 A * 7/1985 Wright ...................... F23R 3/60
60/748
7,752,851 B2 * 7/2010 Daguenet ................ F23R 3/007
60/800

(Continued)

FOREIGN PATENT DOCUMENTS

| JP | 2003083088 A | 3/2003 |
|---|---|---|
| JP | 2004169655 A | 6/2004 |

OTHER PUBLICATIONS

International Search Report and Written Opinion of International Application No. PCT/JP2016/060920 dated Jun. 7, 2016; 11 pp.

*Primary Examiner* — Scott J Walthour
*Assistant Examiner* — Todd N Jordan
(74) *Attorney, Agent, or Firm* — Hauptman Ham, LLP

(57) ABSTRACT

A gas turbine includes a compressor, a combustor, and a turbine. The compressor, the combustor, and the turbine are arranged along an extending direction of a rotating shaft. The gas turbine also includes a combustor casing housing the combustor and a turbine casing housing the turbine. The combustor casing and the turbine casing are joined to each other via respective flanges thereof projecting toward the outside. The gas turbine further includes a projection part on an inner face of the combustor casing. The projection part projects toward the inside in a radial direction in at least part of a range in the extending direction of the rotating shaft between the flanges and an end of a combustion chamber on the compressor side in the combustor.

3 Claims, 4 Drawing Sheets

(51) Int. Cl.
    *F02C 7/20* (2006.01)
    *F23R 3/42* (2006.01)

(56) References Cited

U.S. PATENT DOCUMENTS

| | | | |
|---|---|---|---|
| 9,856,753 B2 * | 1/2018 | Chow | .................. F01D 25/243 |
| 2003/0046940 A1 | 3/2003 | Matsuda et al. | |
| 2006/0010879 A1 * | 1/2006 | Aumont | .................... F23R 3/60 |
| | | | 60/796 |
| 2006/0032237 A1 * | 2/2006 | Aumont | ................. F23R 3/007 |
| | | | 60/796 |
| 2013/0291544 A1 | 11/2013 | Eastwood et al. | |

* cited by examiner

GAS TURBINE COMBUSTOR CASING HAVING A PROJECTION PART

RELATED APPLICATIONS

The present application is a National Phase of PCT/JP2016/060920, filed Apr. 1, 2016, and claims priority based on Japanese Patent Application No. 2015-252492, filed Dec. 24, 2015.

FIELD

The present invention relates to a gas turbine.

BACKGROUND

Typically, a gas turbine includes a compressor, a combustor, and a turbine, and casings thereof are joined to each other with bolts via flanges on outer circumference parts (for example, refer to Patent Literature 1).

CITATION LIST

Patent Literature

Patent Literature 1: Japanese Patent Application Laid-open No. 2004-169655

SUMMARY

Technical Problem

In a gas turbine, compressed air that is led to a combustor from a compressor has the highest pressure, and has the highest temperature before reaching the combustor. The compressed air is sent from a diffuser at an outlet of the compressor toward the combustor, collides with the combustor in a combustor casing in which the combustor is housed, and part of the compressed air reaches an outer circumference part of the combustor. The outer circumference part of the combustor has a space formed between the combustor and the combustor casing, and the compressed air that has collided with the combustor spreads to the outside of the outer circumference part of the combustor, so that flow velocity in the vicinity of the combustor casing on the outside is higher than that in the vicinity of the combustor. Thus, an inner face of the combustor casing is subjected to high-temperature compressed air. In recent years, a pressure ratio of the compressor tends to be increased for improving fuel efficiency, and the temperature of the compressed air sent from the outlet of the compressor to the combustor is increased in accordance with the increase in the pressure ratio.

As disclosed in Patent Literature 1 described above, the casings of the gas turbine are joined to each other with bolts via flanges on the outside. Specifically, the combustor casing and a turbine casing are joined to each other via a flange on the outside thereof. The compressed air in the outer circumference part of the combustor described above flows toward the flange that joins the combustor casing with the turbine casing. A heat transfer coefficient around the flange is low due to stagnant air, and the heat transfer coefficient within the combustor casing is high due to high flow velocity of the compressed air, so that very large temperature distribution is caused in the flange inside and outside the casing. Specifically, in a gas turbine for an aircraft, the number of revolutions is increased within several tens of seconds at the time of takeoff to raise pressure and increase output, so that the flange is subjected to high-temperature compressed air at this time. Thus, excessive thermal stress is applied to the flange that joins the combustor casing with the turbine casing, a generation rate of a fault such as a crack is increased and a frequency of parts replacement is increased. Thus, there is a demand for reducing the thermal stress on the flange.

The present invention has been made for solving the problems described above, and provides a gas turbine that can reduce the thermal stress on the flange that joins the combustor casing with the turbine casing.

Solution to Problem

To achieve the object described above, a gas turbine of the present invention includes a compressor, a combustor, and a turbine, which are arranged along an extending direction of a rotating shaft, and also includes a combustor casing housing the combustor and a turbine casing housing the turbine, which are joined to each other via respective flanges thereof projecting toward the outside. The gas turbine includes a projection part on an inner face of the combustor casing, the projection part projecting toward the inside in a radial direction in at least part of a range in the extending direction of the rotating shaft between the flanges and an end of a combustion chamber on the compressor side in the combustor.

With this gas turbine, by arranging the projection part on the inner face of the combustor casing, the projection part functions as a dam for compressed air that spreads to the outside of the combustion chamber and flows along the inner face of the combustor casing, and guides the flow of the compressed air toward the inside in a radial direction. As a result, the flow of the compressed air that is led to the flange can be inhibited, and the thermal stress on the flange can be reduced.

In the gas turbine of the present invention, the projection part is arranged at a position, except for a position at the inside in the radial direction of the combustor casing at which the flange is formed.

With this gas turbine, by arranging the projection part at a position except the position at the inside in the radial direction of the combustor casing at which the flange is formed, heat transmission from the projection part to the flange can be prevented. As a result, the thermal stress on the flange can be reduced.

In the gas turbine of the present invention, a projecting end of the projection part projecting toward the inside in the radial direction from an inner face of the combustor casing is arranged at a more outside in the radial direction than the outermost position in the radial direction in the combustion chamber.

With this gas turbine, the projecting end of the projection part is arranged on the more outside in the radial direction than the outermost position in the radial direction of the combustion chamber, so that, at the time of relatively moving the combustion chamber and the combustor casing in the extending direction of the rotating shaft for attachment or removal, the combustion chamber and the combustor casing can be prevented from interfering with each other, and an assembly property can be improved.

In the gas turbine of the present invention, a surface of the projection part facing the compressor has an inclined surface gradually inclined to the outside in the radial direction from the inner face of the combustor casing toward the turbine.

With this gas turbine, by arranging the inclined surface on the projection part, the compressed air can be guided to be smoothly separated from the inner face of the combustor casing, and unrequired turbulence of the compressed air can be prevented.

In the gas turbine of the present invention, a surface of the projection part facing the turbine is formed to rise steeply from the inner face of the combustor casing.

With this gas turbine, when the surface facing the turbine is formed to rise steeply from the inner face of the combustor casing, the compressed air easily comes off from the projecting end of the projection part. Thus, the compressed air can be separated from the inner face of the combustor casing, and an effect of reducing the thermal stress on the flange can be significantly obtained.

In the gas turbine of the present invention, the projection part is separately attached to the inner face of the combustor casing.

With this gas turbine, by separately attaching the projection part to the inner face of the combustor casing, the projection part can be attached to an existing gas turbine.

Advantageous Effects of Invention

According to the present invention, the thermal stress on the flange that joins the combustor casing with the turbine casing can be reduced.

DESCRIPTION OF EMBODIMENTS

The following describes an embodiment according to the present invention in detail based on the drawings. The present invention is not limited to the embodiment. Components in the following embodiment include a component that is replaceable and easily conceivable by those skilled in the art, or substantially the same component.

Figure 1:
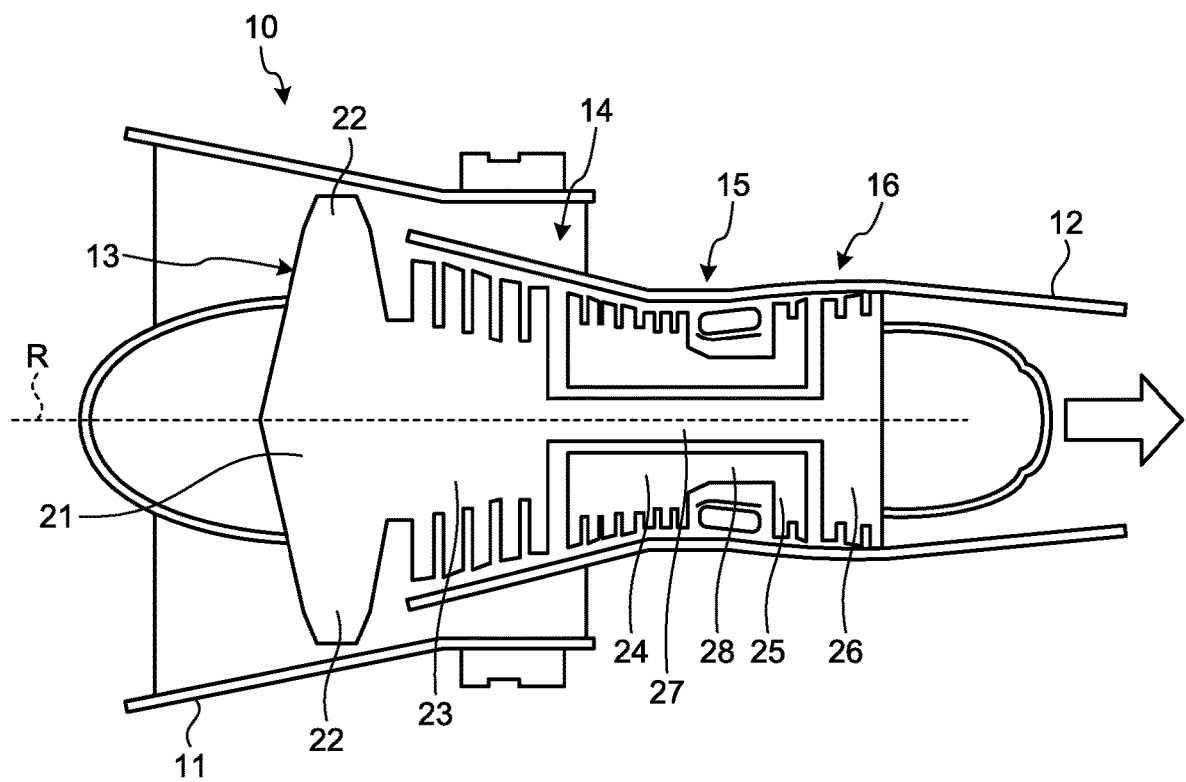
FIG. 1 is a schematic configuration diagram of a gas turbine according to an embodiment of the present invention.

FIG. 1 is a schematic configuration diagram of a gas turbine according to the present embodiment.

As illustrated in FIG. 1, a gas turbine 10 is a gas turbine for an aircraft, and includes a fan casing 11 and a main body casing 12. The fan casing 11 houses a fan 13 therein, and the main body casing 12 houses a compressor 14, a combustor 15, and a turbine 16 therein. The compressor 14, the combustor 15, and the turbine 16 are arranged along an extending direction of an axis R of a rotating shaft 21.

The fan 13 is configured such that a plurality of fan blades 22 are mounted on an outer circumference part of the rotating shaft 21. The rotating shaft 21 is supported to be rotatable about the axis R with respect to the fan casing 11 and the main body casing 12. The fan 13 rotates about the axis R following rotation of the rotating shaft 21, and sends air to the main body casing 12 along the axis R.

The compressor 14 includes a low pressure compressor 23 and a high pressure compressor 24 arranged from an upstream side to a downstream side of air flow. The combustor 15 is positioned on a more downstream side of air flow than the compressor 14, and arranged along a circumferential direction around the rotating shaft 21. The turbine 16 is positioned on a more downstream side of air flow than the combustor 15, and includes a high pressure turbine 25 and a low pressure turbine 26 arranged from the upstream side to the downstream side of air flow. The rotating shaft 21 of the fan 13 is coupled to the low pressure compressor 23, and the low pressure compressor 23 is coupled to the low pressure turbine 26 via a first rotor shaft 27 that is coupled to the rotating shaft 21 on the same axis R. The high pressure compressor 24 is coupled to the high pressure turbine 25 via a second rotor shaft 28 having a cylindrical shape that is positioned on the same axis R on an outer peripheral side of the first rotor shaft 27.

Thus, the air that is sent by the fan 13 and taken in by the compressor 14 passes through a plurality of compressor vanes and compressor blades in the low pressure compressor 23 and the high pressure compressor 24 to be compressed, and the air becomes high-temperature, high-pressure compressed air. Fuel is supplied to the compressed air by the combustor 15, and high-temperature, high-pressure combustion gas as working fluid is generated. When the combustion gas generated by the combustor 15 passes through the turbine vanes and turbine blades in the high pressure turbine 25 and the low pressure turbine 26 that constitute the turbine 16, rotational force is generated. In this case, the rotational force of the low pressure turbine 26 is transmitted to the low pressure compressor 23 to be driven via the first rotor shaft 27. The rotational force of the high pressure turbine 25 is transmitted to the high pressure compressor 24 to be driven via the second rotor shaft 28. The rotational force of the low pressure compressor 23 is transmitted to the fan 13 to be driven via the rotating shaft 21. As a result, thrust can be obtained due to flue gas discharged from the turbine 16.

Figure 2:
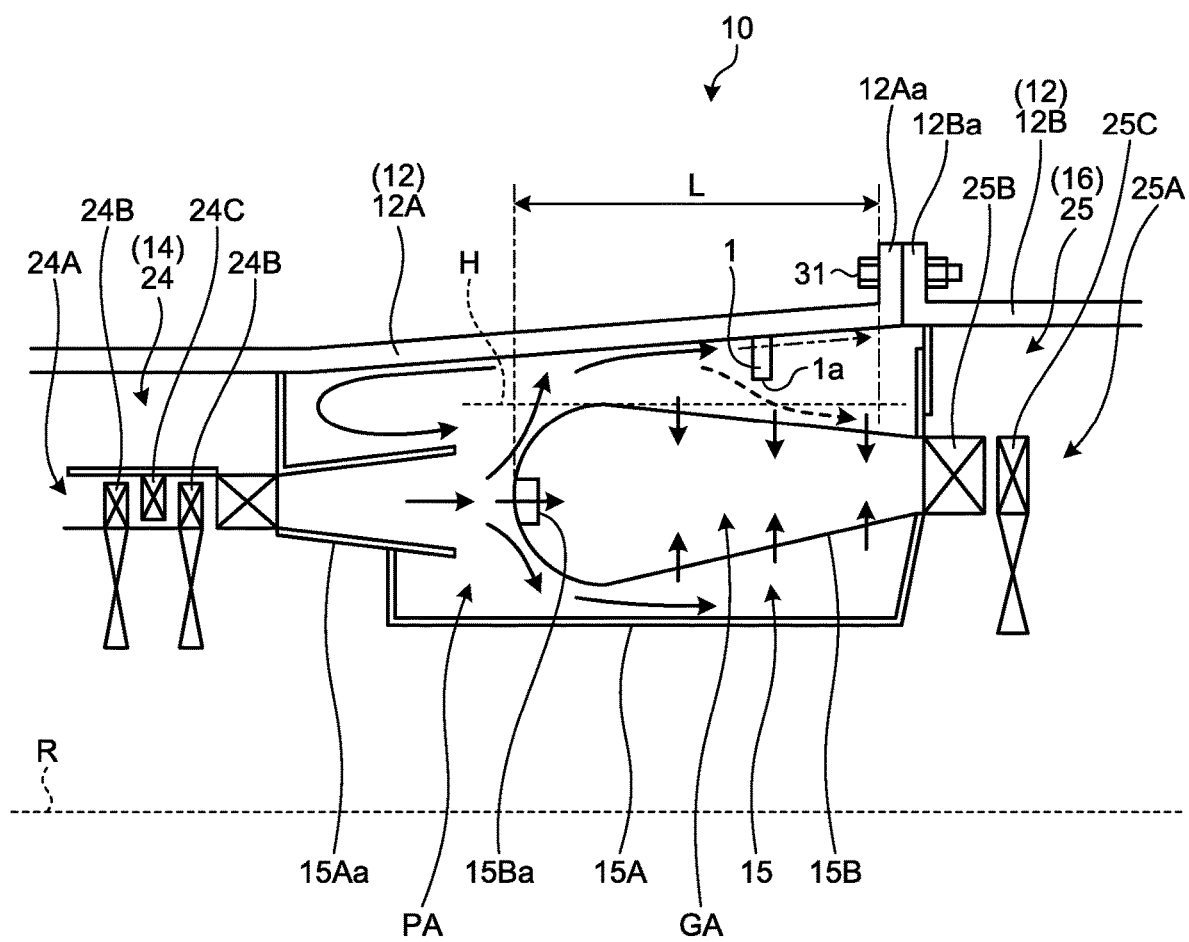
FIG. 2 is an enlarged view of the vicinity of a combustor in the gas turbine according to the embodiment of the present invention.

FIG. 2 is an enlarged view of the vicinity of the combustor in the gas turbine according to the present embodiment.

FIG. 2 illustrates the vicinity of the combustor 15 including part of the high pressure compressor 24, the combustor 15, and part of the high pressure turbine 25.

In the high pressure compressor 24 of the compressor 14, a compressor blade 24B and a compressor vane 24C are alternately arranged in a compressed air passage 24A for passing the compressed air therethrough. The compressed air that has passed through the compressor blade 24B arranged on the most downstream side is supplied to the combustor 15.

In the high pressure turbine 25 of the turbine 16, a turbine vane 25B and a turbine blade 25C are alternately arranged in a combustion gas passage 25A for passing the combustion gas therethrough. The combustion gas generated by the combustor 15 is supplied to the turbine vane 25B arranged on the most upstream side.

The combustor 15 includes an external cylinder 15A and an inner cylinder 15B. The external cylinder 15A is arranged inside a combustor casing 12A as part of the main body casing 12 and formed in an annular shape surrounding the axis R, and forms a compressed air chamber PA between the high pressure compressor 24 of the compressor 14 and the high pressure turbine 25 of the turbine 16 together with the combustor casing 12A. The external cylinder 15A includes a diffuser 15Aa, and the compressed air chamber PA communicates with the compressed air passage 24A of the high pressure compressor 24 via the diffuser 15Aa. Thus, in the external cylinder 15A, the compressed air is introduced to the compressed air chamber PA via the diffuser 15Aa from the high pressure compressor 24.

The inner cylinder 15B is housed in the compressed air chamber PA formed by the combustor casing 12A and the external cylinder 15A. The inner cylinder 15B is formed in an annular shape surrounding the axis R, and forms a combustion gas chamber GA. One end of the inner cylinder 15B is opened to be opposed to the diffuser 15Aa, a fuel injection nozzle 15Ba is arranged in the inner cylinder 15B, and the other end thereof communicates with the combustion gas passage 25A of the high pressure turbine 25 of the turbine 16. Thus, the compressed air is supplied from one end of the inner cylinder 15B to the combustion gas chamber GA, fuel is supplied to the compressed air through the fuel injection nozzle 15Ba to generate combustion gas, and the combustion gas is supplied to the high pressure turbine 25 through the other end thereof. In this way, the inner cylinder 15B is configured as a combustion chamber that generates combustion gas therein.

In the combustor 15, the combustor casing 12A is configured to be separated from a turbine casing 12B that houses the turbine 16 as part of the main body casing 12. By configuring the combustor casing 12A to be separated from the turbine casing 12B, an assembly property of the gas turbine is improved. The combustor casing 12A and the turbine casing 12B respectively have flanges 12Aa and 12Ba projecting and extending outward, and are joined to each other by fastening the flanges 12Aa and 12Ba with a bolt 31.

In the combustor 15, the compressed air supplied from the diffuser 15Aa to the compressed air chamber PA as the inside of the external cylinder 15A does not reach the combustion gas chamber GA as the inside of the inner cylinder 15B as a whole, and part of the compressed air circulates to an outer circumference of the inner cylinder 15B in the compressed air chamber PA. The compressed air circulated to the outer circumference of the inner cylinder 15B is supplied to the combustion gas chamber GA from the outer circumference of the inner cylinder 15B, or supplied to the turbine vane 25B, the turbine blade 25C, the first rotor shaft 27, or the second rotor shaft 28 in the high pressure turbine 25 to be cooled.

However, the compressed air that is led to the compressed air chamber PA has high temperature in the compressor 14, and part of the compressed air circulated to the outer circumference of the inner cylinder 15B in the compressed air chamber PA flows along an inner face of the combustor casing 12A as indicated by an arrow of two-dot chain line in FIG. 2 and spreads to the outside of an outer peripheral surface of the inner cylinder 15B, so that flow velocity thereof is higher on the inner face side of the combustor casing 12A than that in the vicinity of the inner cylinder 15B. Accordingly, excessive thermal stress is applied to the flanges 12Aa and 12Ba of the combustor casing 12A and the turbine casing 12B due to the high-temperature compressed air, a generation rate of a fault such as a crack is increased, and a frequency of parts replacement is increased.

The gas turbine 10 according to the present embodiment includes, on the inner face of the combustor casing 12A, a projection part 1 projecting toward the inside in a radial direction in at least part of a range in an extending direction of the rotating shaft 21 between an end (one end) of the inner cylinder 15B on the compressor 14 side and the flanges 12Aa and 12Ba. The radial direction is a direction orthogonal to the axis R of the rotating shaft 21, and the inside in the radial direction is a side close to the axis R. The outside in the radial direction is a side distant from the axis R. The projection part 1 is continuously arranged in the circumferential direction.

That is, by arranging the projection part 1 on the inner face of the combustor casing 12A, the projection part 1 functions as a dam for the compressed air that spreads to the outside of the inner cylinder 15B and flows along the inner face of the combustor casing 12A, and guides the flow of compressed air toward the inside in the radial direction as indicated by an arrow of dashed line in FIG. 2. As a result, the flow of the compressed air led to the flanges 12Aa and 12Ba can be inhibited, and the thermal stress on the flanges 12Aa and 12Ba can be reduced.

In a case in which the projection part 1 is arranged to be closer to the compressor 14 than the end (one end) of the inner cylinder 15B on the compressor 14 side, the compressed air passes through the turbine 16 side of the projection part 1 and spreads to the outside of the inner cylinder 15B to flow along the inner face of the combustor casing 12A, so that the thermal stress on the flanges 12Aa and 12Ba cannot be reduced. Thus, the projection part 1 needs to be arranged in at least part of the range in the extending direction of the rotating shaft 21 between the end (one end) of the inner cylinder 15B on the compressor 14 side and the flanges 12Aa and 12Ba. In FIG. 2, the single projection part 1 is illustrated, but a plurality of projection parts 1 may be arranged. In a case of arranging a plurality of projection parts 1, the position of a projecting end 1a at the inside in the radial direction is preferably horizontal to the axis R, or preferably comes closer to the axis R toward the turbine 16. It is preferable that the projecting end 1a of the projection part 1 be not in contact with the outer peripheral surface of the inner cylinder 15B for preventing collision therebetween.

In the gas turbine 10 according to the present embodiment, the projection part 1 is preferably arranged at a position except the position at the inside in the radial direction of the combustor casing 12A at which the flange 12Aa is formed.

Specifically, as illustrated in FIG. 2, the projection part 1 is preferably arranged in at least part of a range L except the position at the inside in the radial direction of the combustor casing 12A at which the flange 12Aa is formed, in a range in the extending direction of the rotating shaft 21 between the end (one end) of the inner cylinder 15B on the compressor 14 side and the flanges 12Aa and 12Ba.

By arranging the projection part 1 at a position except the position at the inside in the radial direction of the combustor casing 12A at which the flange 12Aa is formed, heat transmission from the projection part 1 to the flange 12Aa can be prevented. As a result, the thermal stress on the flanges 12Aa and 12Ba can be reduced.

In the gas turbine 10 according to the present embodiment, the projecting end 1a of the projection part 1 projecting toward the inside in the radial direction from the inner face of the combustor casing 12A is preferably arranged at a more outside in the radial direction than the outermost position in the radial direction of the inner cylinder 15B.

As illustrated in FIG. 2, when the projecting end 1a of the projection part 1 is arranged on a more outside in the radial direction than the outermost position H in the radial direction of the inner cylinder 15B, the inner cylinder 15B and the combustor casing 12A can be prevented from interfering with each other at the time of relatively moving the inner cylinder 15B and the combustor casing 12A in the extending direction of the axis R of the rotating shaft 21 for attachment or removal, and the assembly property can be improved.

FIG. 3 to FIG. 6 are enlarged views of a principal part in the gas turbine according to the present embodiment. The principal part indicates the projection part 1 described above.

As illustrated in FIG. 3 to FIG. 6, in the gas turbine 10 according to the present embodiment, a surface of the projection part 1 facing the compressor 14 preferably has an inclined surface 1A gradually inclined to the outside in the radial direction from the inner face of the combustor casing 12A toward the turbine 16.

Figure 3:
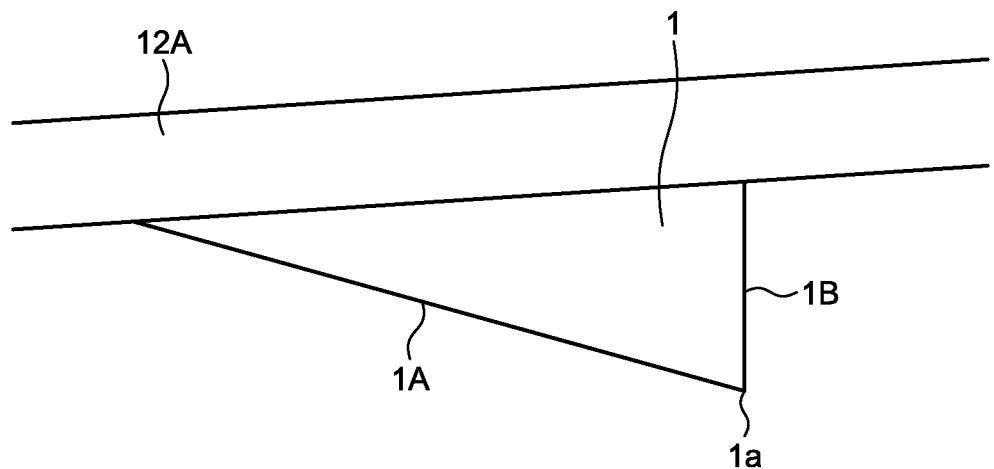
FIG. 3 is an enlarged view of a principal part in the gas turbine according to the embodiment of the present invention.
Figure 4:
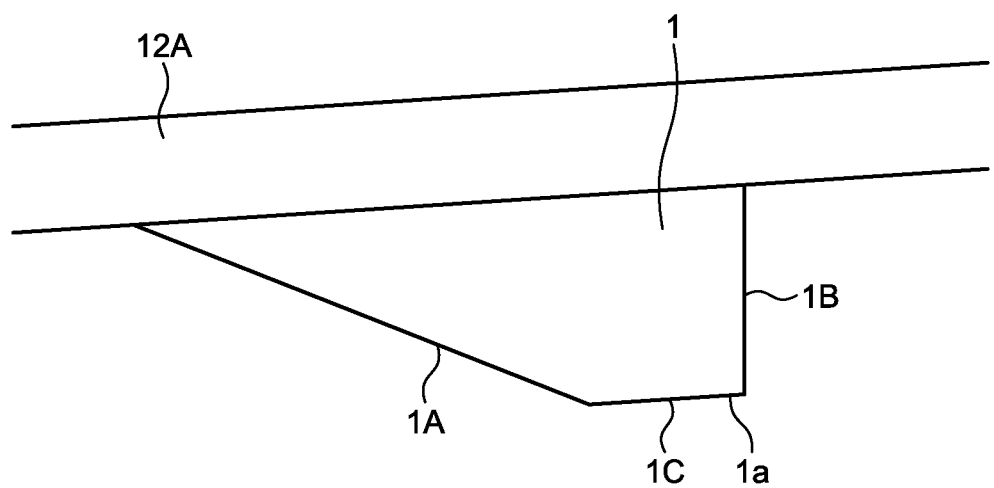
FIG. 4 is an enlarged view of a principal part in the gas turbine according to the embodiment of the present invention.
Figure 5:
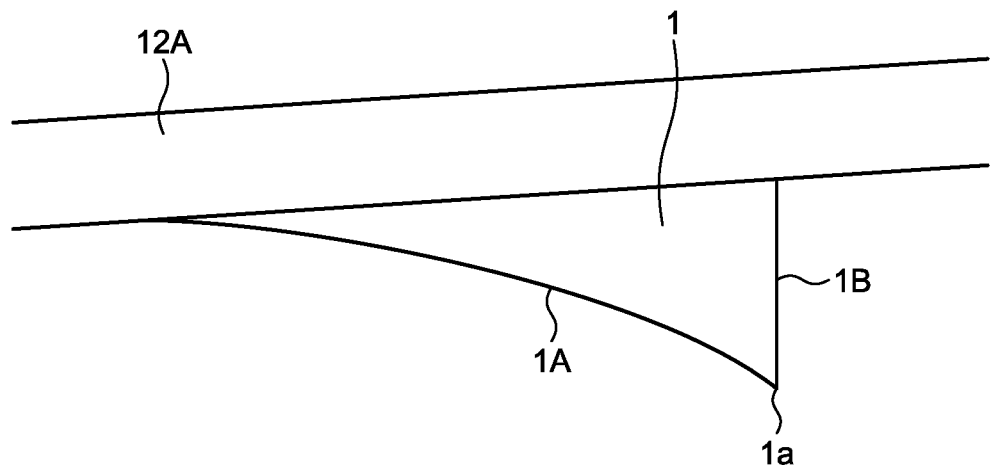
FIG. 5 is an enlarged view of a principal part in the gas turbine according to the embodiment of the present invention.
Figure 6:
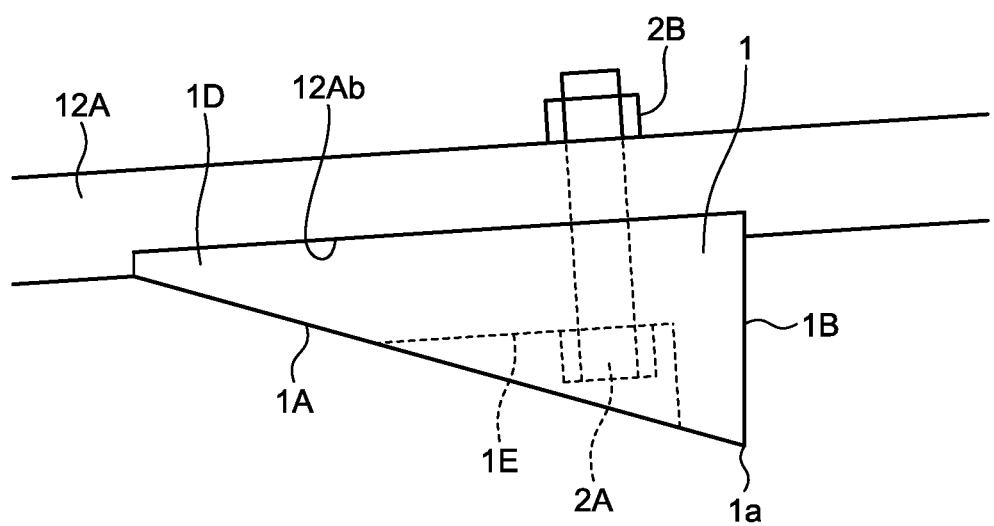
FIG. 6 is an enlarged view of a principal part in the gas turbine according to the embodiment of the present invention.

By providing the inclined surface 1A to the projection part 1, the compressed air can be guided to be smoothly separated from the inner face of the combustor casing 12A, and unrequired turbulence of the compressed air can be prevented from being caused. As illustrated in FIG. 3, FIG. 4, and FIG. 6, the inclined surface 1A may be formed to be straightly inclined to the outside in the radial direction from the inner face of the combustor casing 12A, or may be formed to curve in a recessed shape as illustrated in FIG. 5. As illustrated in FIG. 3, FIG. 5, and FIG. 6, the projecting end 1a may be formed as a corner, but may be formed as a plane 1C as illustrated in FIG. 4.

As illustrated in FIGS. 3 to 6, in the gas turbine 10 according to the present embodiment, a surface 1B facing the turbine 16 of the projection part 1 is preferably formed to rise steeply from the inner face of the combustor casing 12A.

When the surface 1B facing the turbine 16 is formed to rise steeply from the inner face of the combustor casing 12A, the compressed air easily comes off from the projecting end 1a of the projection part 1. Due to this, the compressed air can be separated from the inner face of the combustor casing 12A, and a significant effect of reducing the thermal stress on the flanges 12Aa and 12Ba can be obtained. If the compressed air hardly comes off from the projecting end 1a of the projection part 1, the compressed air flows along the inner face of the combustor casing 12A, so that the effect of reducing the thermal stress on the flanges 12Aa and 12Ba is deteriorated.

As illustrated in FIG. 6, in the gas turbine 10 according to the present embodiment, the projection part 1 is preferably separately attached to the inner face of the combustor casing 12A.

Specifically, as illustrated in FIG. 6, in the projection part 1, an engagement part 1D engaging with a recessed part 12Ab formed on the inner face of the combustor casing 12A is formed, and a reception surface 1E that receives a head part of a bolt 2A is formed. By shrink-fitting the engagement part 1D to the recessed part 12Ab, causing the bolt 2A to pass through the projection part 1 and the combustor casing 12A, and tightly fastening a nut 2B to the bolt 2A on the outside of the combustor casing 12A, the projection part 1 is separately attached to the inner face of the combustor casing 12A.

By separately attaching the projection part 1 to the inner face of the combustor casing 12A, the projection part 1 can be attached to the existing gas turbine 10. In the gas turbine 10 to be newly made, the projection part 1 may be molded to project from the inner face of the combustor casing 12A.

A thermal insulation coating (for example, a thermal barrier coating (TBC)) may be applied to the surface of the projection part 1 or the inner face of the combustor casing 12A. By applying the thermal insulation coating, a significant effect of reducing the thermal stress on the flanges 12Aa and 12Ba can be obtained.

The projection part 1 may be used, although not illustrated in the drawings, for a gas turbine for electric power generation and the like applied to thermal power generation, in addition to the gas turbine 10 for an aircraft illustrated in FIG. 1.

REFERENCE SIGNS LIST 1 projection part
1a projecting end
1A inclined surface
1B surface facing turbine
1C plane of projecting end
1D engagement part
1E reception surface
2A bolt
2B nut
10 gas turbine
11 fan casing
12 main body casing
12A combustor casing
12Aa flange
12Ab recessed part
12B turbine casing
12Ba flange
13 fan
14 compressor
15 combustor
15A external cylinder
15Aa diffuser
15B inner cylinder
15Ba fuel injection nozzle
16 turbine
21 rotating shaft
22 fan blade
23 low pressure compressor
24 high pressure compressor
24A compressed air passage
24B compressor blade
24C compressor vane
25 high pressure turbine
25A combustion gas passage
25B turbine vane
25C turbine blade
26 low pressure turbine
27 first rotor shaft
28 second rotor shaft
31 bolt
GA combustion gas chamber
H outermost position in radial direction
L range
PA compressed air chamber
R axis

The invention claimed is:
1. A gas turbine, comprising:
a rotating shaft;
a compressor;
a combustor including a combustion chamber;
a turbine, the compressor, the combustor, and the turbine being arranged along an extending direction of the rotating shaft;

a combustor casing that includes a first flange projecting radially outward from the combustor casing and houses the combustor;

a turbine casing that includes a second flange projecting radially outward from the turbine casing and houses the turbine, the combustor casing and the turbine casing being joined to each other via the first and second flanges; and a projection part on an inner face of the combustor casing, the projection part projecting radially inward from the combustor casing, the projection part being annular and extending about a longitudinal axis of the gas turbine, wherein:

the combustor casing includes, on the inner face of the combustor casing, a recessed part in which the projection part is fitted, the projection part includes a reception surface configured to receive a head part of a bolt, the projection part is attached to the inner face of the combustor casing by fitting the projection part to the recessed part, passing the bolt through the projection part and the combustor casing, and fastening a nut to the bolt, the nut radially outward of the combustor casing, a surface of the projection part facing the compressor has an inclined surface, the inclined surface inclined in the radial direction from the inner face of the combustor casing to a projecting end of the projection part, a surface of the projection part facing the turbine extends in the radial direction from the inner face of the combustor casing to the projecting end of the projection part, and the projecting end of the projection part is a radially most inward portion of the projection part, the projecting end of the projection part is radially spaced away from the combustion chamber, and the projecting end of the projection part is arranged radially inward of the bolt.

2. The gas turbine according to claim 1, wherein no plane defined perpendicularly to the longitudinal axis of the gas turbine passes through both the projection part and the first flange.

3. The gas turbine according to claim 1, wherein the projecting end of the projection part is arranged radially outward of a most radially outward portion of the combustion chamber in the radial direction.

* * * * *